Dec. 12, 1967  B. J. ORR  3,357,362

HYDROSTATIC POWER UNIT

Filed June 17, 1966  2 Sheets-Sheet 1

Inventor
Bobby J. Orr
By Charles E. Schmidt
Attorney

United States Patent Office 3,357,362
Patented Dec. 12, 1967

3,357,362
HYDROSTATIC POWER UNIT
Bobby J. Orr, Springfield, Ill., assignor to Allis-Chalmers Manufacturing Company, Milwaukee, Wis.
Filed June 17, 1966, Ser. No. 558,377
2 Claims. (Cl. 103—161)

This invention relates to a hydrostatic power unit and more particularly to a variable volume radial piston pump or motor utilizing two radial piston blocks with novel means for effecting sealing engagement of the blocks with the housing in which they are rotatably mounted.

It is an object of this invention to provide automatic means for urging the axial contact sealing faces of a pair of coaxial, radial piston blocks into sealing contact with complementary sealing faces on the housing walls of a hydrostatic pump unit.

It is a further object of this invention to provide a hydraulic actuating mechanism between a pair of radial piston blocks in a hydrostatic power unit for urging the blocks in axially opposite directions to bring complementary axial contact sealing faces formed on the blocks and the power unit housing into effective sealing engagement.

It is a further object of this invention to provide a hydrostatic power unit of the type set forth in the previous object wherein the hydraulic actuating mechanism is pressurized by the high pressure side of the hydrostatic unit.

Figure 1:
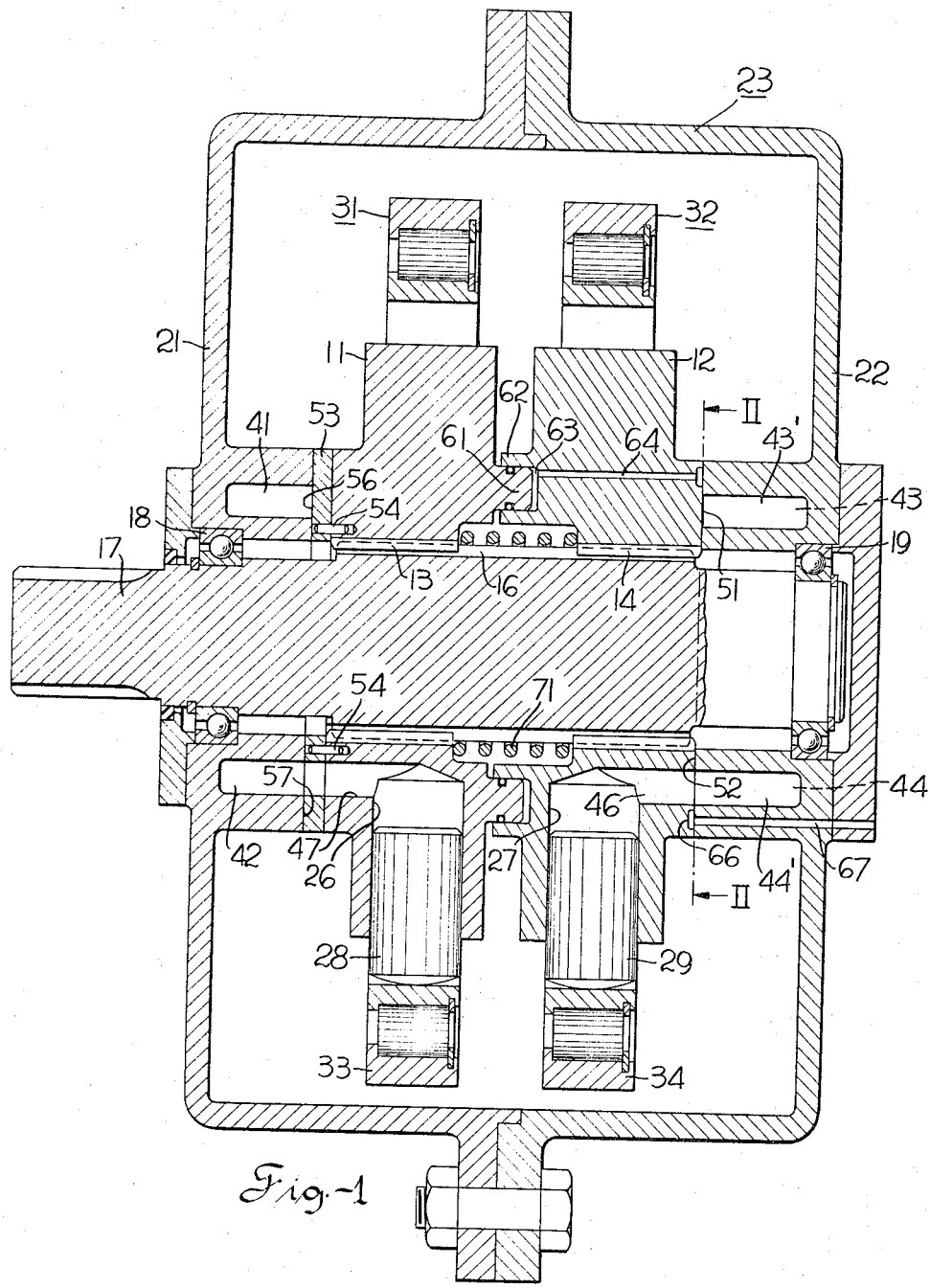
Figure 2:
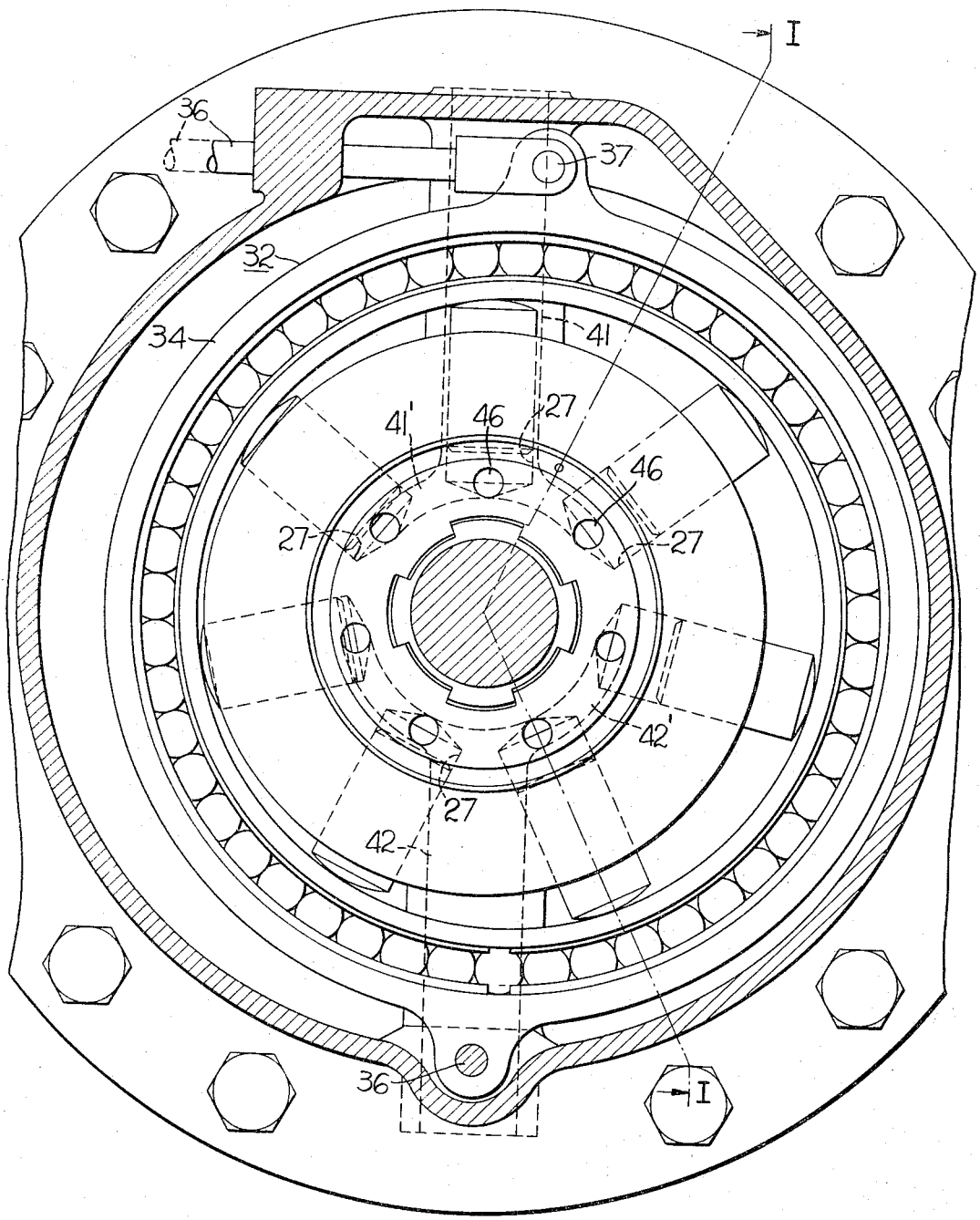

These and other objects and advantages will be apparent to those familiar with the art when the following description is read in conjunction with the drawings in which:

FIG. 1 is a section view taken along the line I—I in FIG. 2 of a hydrostatic power unit in which my invention is incorporated; and FIG. 2 is a section view taken along the line II—II in FIG. 1.

Referring to the drawings, the hydrostatic power unit in which my invention is incorporated includes a pair of radial piston blocks 11, 12, which have aligned internal openings presenting internal splines 13, 14 which cooperate with external splines 16 on shaft 17 to form a power transmitting connection between the shaft and the blocks. The spline connection between the blocks 11, 12 and the shaft 17 permit the blocks 11 and 12 to shift axially relative to the shaft and to each other. The shaft 17 is carried by suitable antifriction bearings 18, 19 mounted in spaced side walls 21, 22 of the hydrostatic power unit housing 23. Each of the radial piston blocks has a plurality of circumferentially spaced and radially extending cylinders 26, 27 in which radially disposed pistons 28, 29 are reciprocally mounted.

Control ring assemblies 31, 32 are provided for the pistons 28, 29 so as to permit independent control of the two hydrostatic mechanisms incorporated within the hydrostatic unit. The outer raceways 33, 34 are pivotally connected to the housing by a pin 36 and control rods 36, 37 are pivotally connected to the diametrically opposite sides of the outer raceways 33, 34. In FIG. 2, rod 36 is shown pivotally connected to the outer raceway 34 of ring 32 by pin 37. Suitable input and output passages 41, 42, 43 and 44 are provided for the dual pumps or motors of the hydrostatic unit. As is well understood, the illustrated hydrostatic unit may be operated as a pump or as a motor and both of the hydrostatic power devices may be independently controlled as to output flow or speed and direction of flow or shaft rotation.

Each of the cylinders 27 of block 12 has an axially extending opening or passage 46 which registers with the crescent shaped mouth 43′ of passage 43 and the crescent shaped mouth 44′ of passage 44 in a conventional manner as the shaft 17 rotates. Likewise, the passages 47 extending from cylinders 26 of block 11 register with crescent shaped mouths 41′, 42′ of inlet-outlet passages 41, 42 during rotation of shaft 17 and blocks 11, 12. Block 12 has a flat side presenting an annular flat sealing face or surface 51 in axial contact sealing engagement with a cooperating annular sealing face or surface 52 on housing wall 22. Piston block 11 is provided with a wearplate 53 secured for rotation therewith by pins 54. The wearplate presents a flat annular sealing face or surface 56 in axially contacting and sealing relation with a flat annular sealing face or surface 57 formed on the sidewall 21.

During operation of the hydrostatic unit, as a pump for instance, with the shaft rotating clockwise as viewed in FIG. 2, fluid will be drawn in passage 41 and forced out passage 42. Thus, as a pump with the control ring adjusted as shown in FIG. 2, passage 42 is a high pressure passage. During operation as either a pump or motor, one of the two input-output passages 41, 42 will normally be low pressure and the other will be high pressure. This is also true of passages 43, 44.

In order to provide sufficient axial thrust to effectively maintain axial sealing contact between surfaces 56, 57 and 51, 52, I provide a hydraulic actuator mechanism which is axially interposed between the blocks 11 and 12. The hydraulic actuator mechanism includes a piston part on block 11 in the form of an axially extending annular flange 61 and a cylinder part 62 on block 12 presenting an annular recess 63 which is placed in fluid communication with the high pressure side of the right hand hydrostatic device, as viewed in FIG. 1, by passage 64 via a collector groove 66 and in block 12 and a high pressure supply passage 67 in the wall 22 of housing 23. Suitable means may be provided to place passage 67 in communication with one of the high pressure passages of the hydrostatic unit. It may be desirable to employ a conventional compression spring 71 between the blocks 11, 12 to insure initial build-up of pressure on startup of the hydrostatic unit. Any wear of the seal surfaces or faces 51, 52, 56, 57 will be compensated for by axial movement of the blocks 11 and 12 away from one another.

My sealing arrangement insures automatic loading for proper sealing, with the loading on the sealing surfaces corresponding to the output pressure of the high pressure side of the unit. Further, my fluid pressure actuated sealing arrangement automatically adjusts the blocks 11, 12 axially to compensate for wear of the axial contact sealing faces 51, 52, 56, 57.

The embodiments of the invention in which an exclusive property or privilege is claimed are defined as follows:

1. In a hydrostatic power unit of the type having a housing, a pair of radial piston blocks within the housing, a shaft extending through the blocks and secured thereto for rotation therewith and for axial shifting movement relative thereto and to each other, high and low pressure passages for conveying fluid to and from each of the blocks and cooperating axial contact annular sealing surfaces on the housing and axially remote sides of the blocks, the improvement comprising:

means for urging said blocks in axially opposite directions to insure sealing engagement of said sealing surfaces including
  a hydraulic actuator mechanism axially interposed between said blocks and operative when supplied with pressure fluid to urge said blocks in axially opposite directions
 passage means placing said actuator in fluid communication with one of said high pressure passages.

2. The structure set forth in claim 1 wherein said actuator mechanism includes piston and cylinder parts formed on axially confronting sides of said blocks, respectively.

References Cited

UNITED STATES PATENTS

| | | | |
|---|---|---|---|
| 3,010,405 | 11/1961 | Tomell | 103—161 |
| 3,068,805 | 12/1962 | Byers | 103—161 |

EDGAR W. GEOGHEGAN, *Primary Examiner.*